Figure 1:
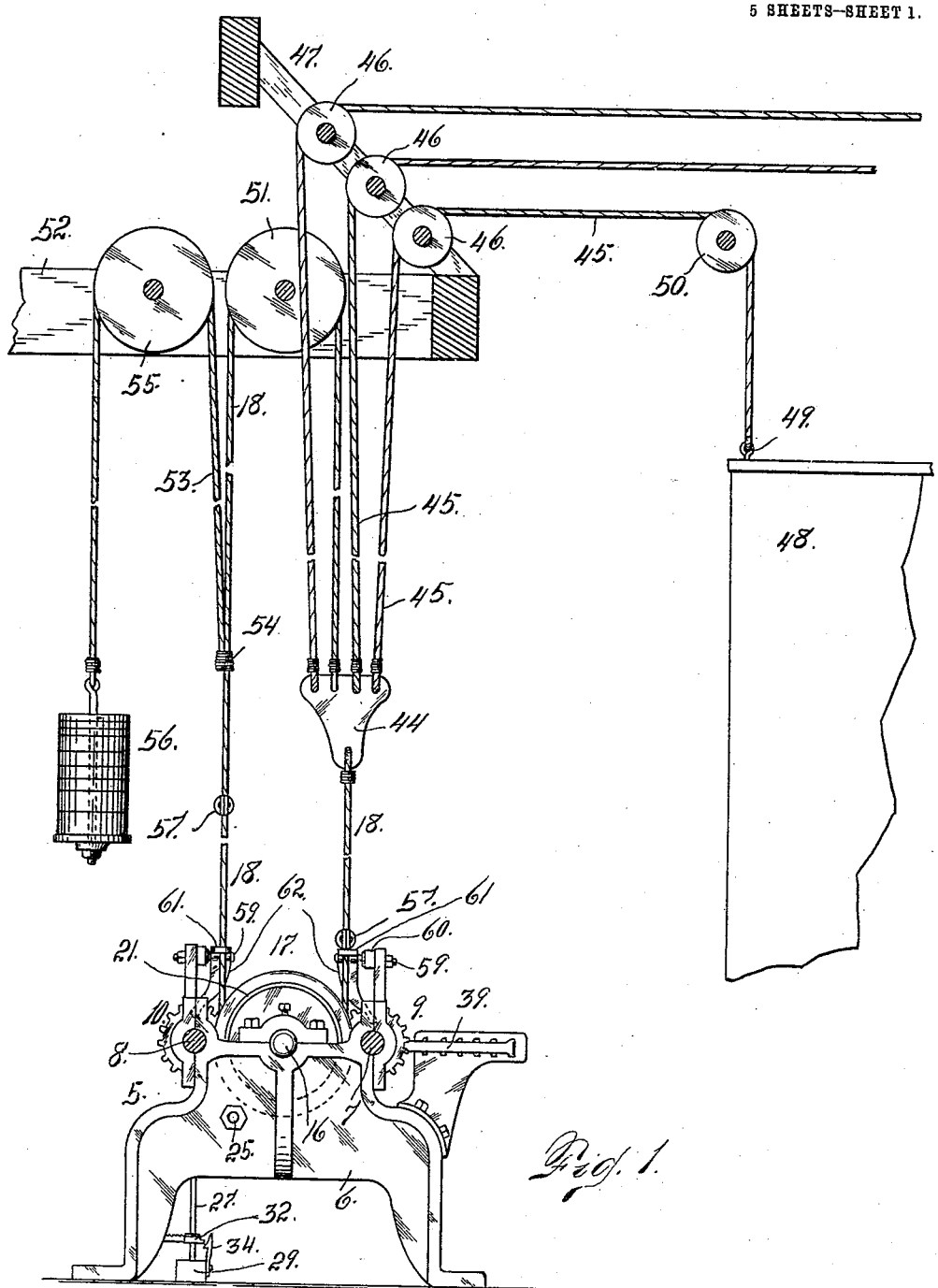

S. G. BAILEY.
MECHANISM FOR HANDLING HANGING SCENERY.
APPLICATION FILED DEC. 7, 1908.

977,498.

Patented Dec. 6, 1910.

5 SHEETS—SHEET 1.

Witnesses
Otto E. Hoddick
J. D. Thornburgh

Inventor
Seth G. Bailey
By
Attorney

S. G. BAILEY.
MECHANISM FOR HANDLING HANGING SCENERY.
APPLICATION FILED DEC. 7, 1908.

977,498.

Patented Dec. 6, 1910.
5 SHEETS—SHEET 2.

S. G. BAILEY.
MECHANISM FOR HANDLING HANGING SCENERY.
APPLICATION FILED DEC. 7, 1908.

977,498.

Patented Dec. 6, 1910.
5 SHEETS—SHEET 3.

Witnesses
Otto E. Haddick.
J. D. Thornburgh.

Inventor
Seth G. Bailey.
By
Attorney

S. G. BAILEY.
MECHANISM FOR HANDLING HANGING SCENERY.
APPLICATION FILED DEC. 7, 1908.
977,498.
Patented Dec. 6, 1910.
5 SHEETS—SHEET 4.
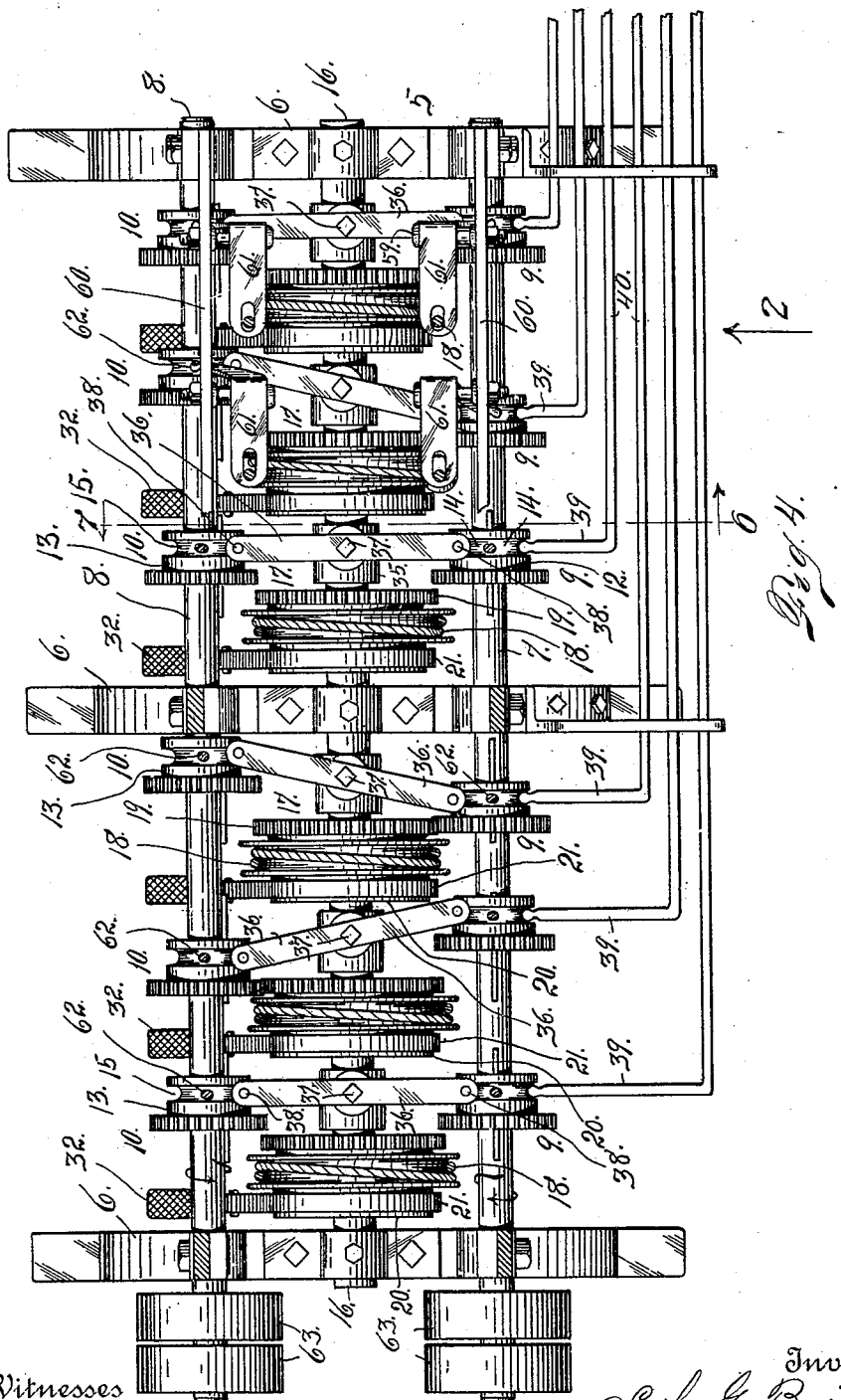
Witnesses
Otto E. Hoddick.
I. D. Thornburgh.
Inventor
Seth G. Bailey.
By
Attorney

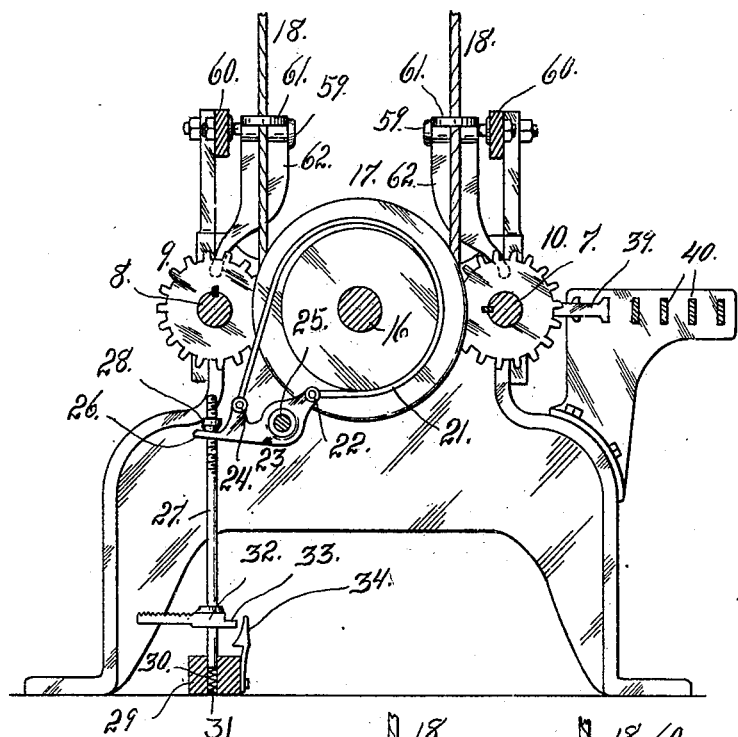
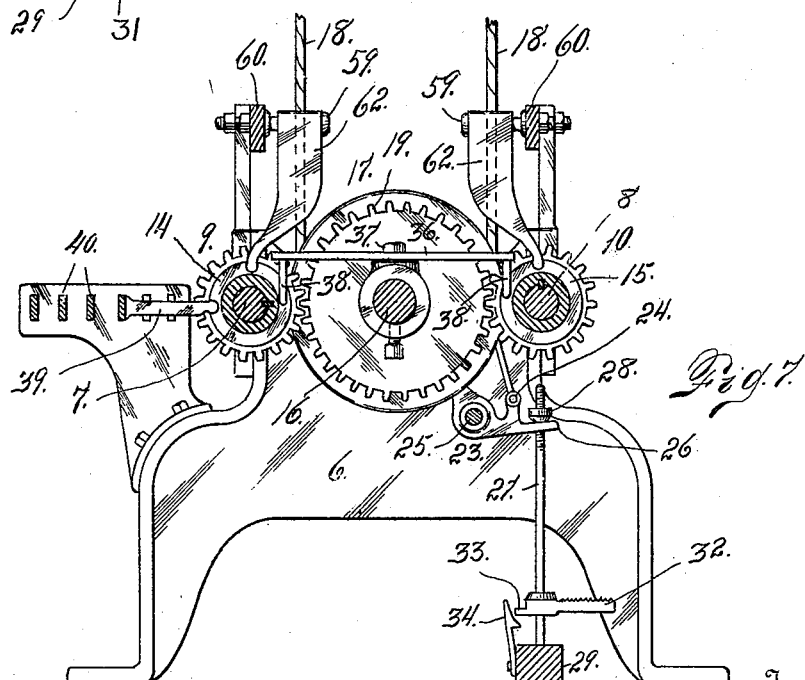

1
UNITED STATES PATENT OFFICE.

SETH G. BAILEY, OF DENVER, COLORADO, ASSIGNOR OF ONE-FOURTH TO MARTIN BECK, OF NEW YORK, N. Y., AND ONE-FOURTH TO ANDREW C. CARSON, OF DENVER, COLORADO.

MECHANISM FOR HANDLING HANGING SCENERY.

977,498.      Specification of Letters Patent.      Patented Dec. 6, 1910.

Application filed December 7, 1908. Serial No. 466,307.

*To all whom it may concern:*

Be it known that I, SETH G. BAILEY, a citizen of the United States, residing in the city and county of Denver and State of Colorado, have invented certain new and useful Improvements in Mechanism for Handling Hanging Scenery; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for handling curtains and the hangings and other apparatus termed scenery in theaters or other places where articles of this kind are used.

My object is to provide means whereby it becomes practicable for a single person to manipulate mechanism for controlling the curtains and entire stage scenery in a large theater.

The person in charge of the work occupies a position in convenient proximity to a number of levers which are connected with rods leading to gears slidably mounted upon an operating shaft. These gears are splined on the shaft and the movement of the rods serve to throw the gears in the one direction or the other whereby they are thrown into or out of mesh with other gears mounted upon drums loose upon an adjacent shaft, with which drums the cables for shifting the curtains and scenery are connected. There are two of these operating shafts, one being located on each side of the drum shaft, each of the operating shafts being similarly equipped with slidable gears which are splined thereon. The gears of the two operating shafts are each provided with a hub or extension in which is formed a groove. A lever centrally fulcrumed has its extremity provided with pins which engage the grooves of the correspondingly located gears of each pair of gears on the two operating shafts. The individual gears of each of these pairs are so located that when the gear upon one shaft is shifted in one direction the corresponding gear on the opposite shaft is shifted in the opposite direction. In other words, if the gear on one operating shaft is in mesh with the gear of a drum, the mesh gear on the operating shaft may be thrown out of mesh with the drum gear by shifting the operating gear upon its shaft and this movement of the shifted gear acts through the agency of the aforesaid lever to throw the corresponding gear of the opposite shaft into mesh with the drum gear for the purpose of rotating the drum in the opposite direction. Or, by giving the gear on the operating shaft a less degree of movement, it may be thrown out of mesh with the gear upon the drum shaft without throwing the corresponding gear on the opposite shaft into mesh with the drum gear. In this event the drum gear has no movement. When the mechanism is in use it is assumed that the two operating shafts are in continuous motion and that both are turning toward the intermediately located shaft upon which the series of drums is loosely mounted, as aforesaid. Each drum may be utilized to simultaneously operate a number of cables which are employed in handling a single curtain or piece of scenery. In the performance of this function a single cable only is mounted upon the drum. This cable, however, has one extremity connected with a plate, with which is also connected a number of auxiliary cables which lead to the curtains or pieces of scenery to be manipulated. To facilitate the effectiveness of the operation of the mechanism, an additional cable is connected with a counter-balance weight, whereby the cable is held taut at all times during the curtain or scenery-shifting operation.

Having briefly outlined my improved construction, I will proceed to describe the same in detail, reference being made to the accompanying drawing in which is illustrated an embodiment thereof.

Figure 2:
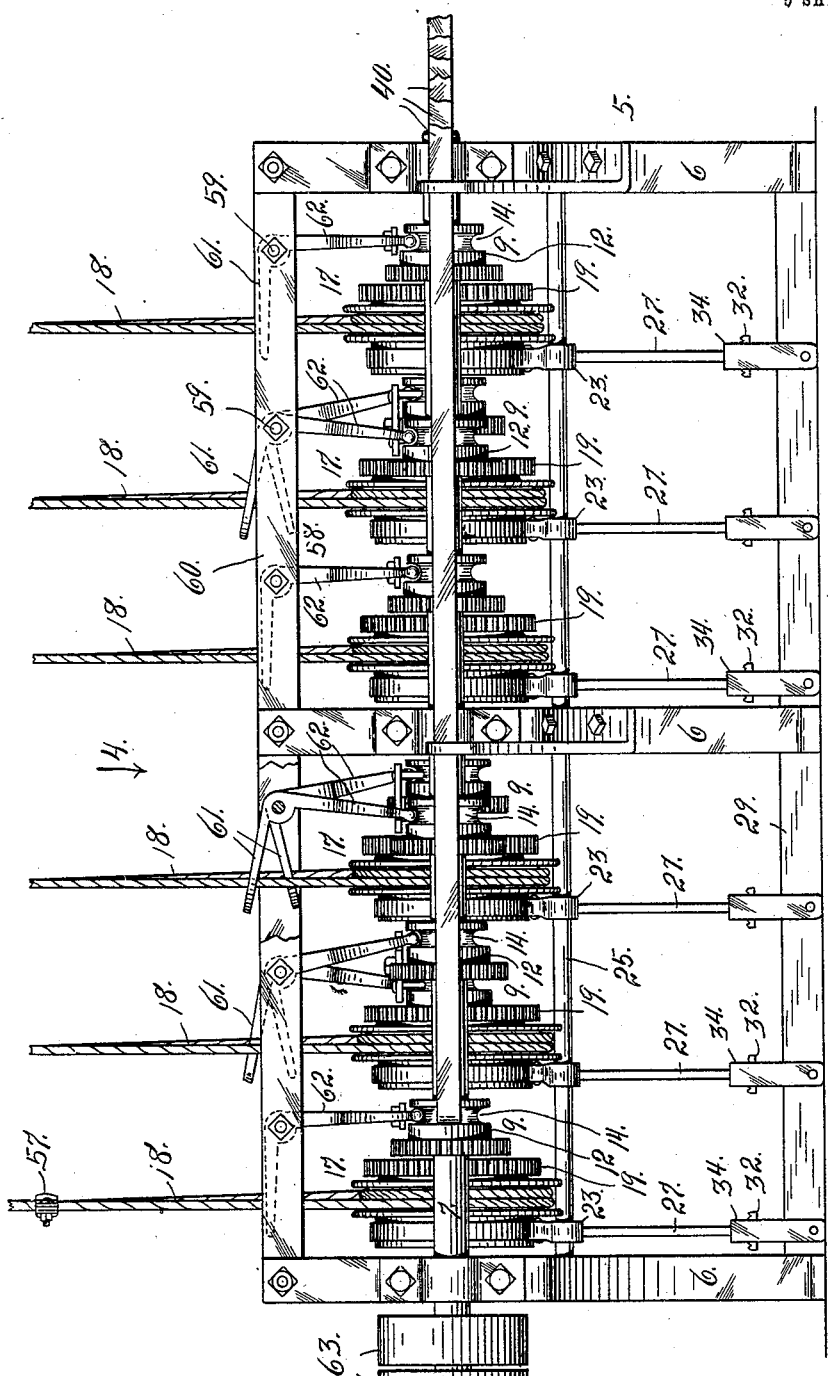
Figure 3:
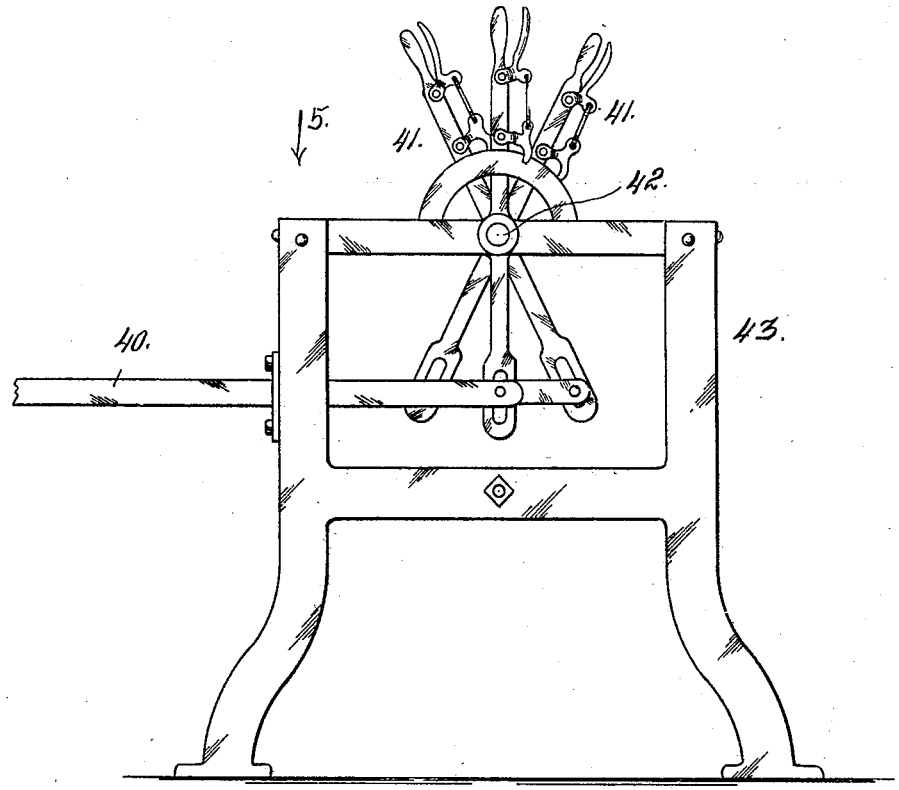
Figure 5:
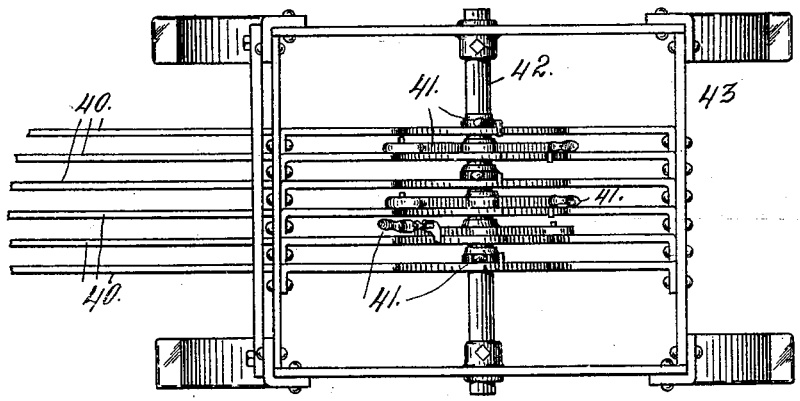

In this drawing, Figure 1 is an elevation partly in section illustrating my improved apparatus in use, one of the cables being shown connected with a curtain or piece of scenery to be handled. Fig. 2 is a side elevation of the operating mechanism looking in the direction of arrow 2 Fig. 4. Fig. 3 is a view illustrating the levers for manipulating the gear-shifting rods shown in Fig. 2. Figs. 2 and 3 may be considered as forming a single view, the rods between the two frames being broken away. It may be stated that while only three levers are shown in Fig. 3, six drums are illustrated in Fig. 2 which would require a corresponding number of operating levers. It may be assumed, however, that there are six levers in Fig. 3 and that the three which do not appear occupy positions directly in line with the three that are visible. Fig. 4 is a top plan view of the construction shown in Fig. 2, or a view looking in the direction of arrow 4 Fig. 2. Fig. 5 is a top plan view of the construction shown in Fig. 3, or a view looking in the direction of arrow 5 Fig. 3. Fig. 6 is a section taken on the line 6—7 Fig. 4, looking in the direction of arrow 6. Fig. 7 is a view taken on the line 6—7 Fig. 4, looking in the direction of arrow 7.

The same reference characters indicate the same parts in all the views.

Let the numeral 5 designate the main framework of the apparatus, the same being composed of three members 6, two of these being located at the ends and one midway between the extremities of the structure. In these frame members are journaled two operating shafts 7 and 8 upon which shafts are respectively splined gears 9 and 10, which are respectively provided with hubs 12 and 13, having circumferential grooves 14 and 15. These gears 9 and 10 are arranged in pairs on the shafts 7 and 8 and are normally oppositely located.

Mounted upon the main frame, but located intermediate the shafts 7 and 8, is a third shaft 16, which may be termed a stationary shaft, and upon which is loosely mounted a number of drums 17, six drums being illustrated in Figs. 2 and 4. With each of these drums is connected a cable 18 which, as shown in the drawing, has a single convolution. One extremity of each drum is provided with a gear 19 while its opposite extremity is equipped with a member 20 which is surrounded by a brake band 21, one extremity of which is shown at 22, with one end of a lever 23 while the opposite end of the brake band is connected, as shown at 24, with the same lever, but upon the opposite side of the fulcrum 25. Through an opening formed in the arm 26 of this lever, a rod 27 is passed and above the lever a stop 28 is threaded upon the rod. The lower end of the rod is vertically movable in an opening 30 formed in a block 29, in which opening is located a coil spring 31, which normally holds the rod at its upward limit of movement, whereby the brake band is loose upon the friction zone or member of the drum. To facilitate the operation of the brake band for braking purposes, the rod 27 is equipped with a foot rest 32. In order to set the brake it is only necessary for the person in charge to place his foot upon the rest 32 and press downwardly thereon, when the lever 23 will be actuated to produce the required effect, since the movement of this lever causes the opposite extremities of the brake band to move in opposite directions. The foot rest is provided with a lug or projection 33 adapted to be engaged by a spring actuated detent or pawl 34 whereby the rod may be locked in its downward or brake-setting position.

Fulcrumed upon the shaft 16 which is enlarged or reinforced, as shown at 35, for the purpose, is a number of levers 36, there being one of these levers for each pair of gears 9 and 10. The fulcrum 37 of each lever is located midway between its extremities, which are provided with pins or lugs 38 which enter the grooves 14 and 15, with which the hubs 12 and 13 of the said gears are provided.

As shown in the drawing, the groove 14 of each gear 9, is engaged by the inwardly projecting part 39 of an operating rod 40, whose opposite extremity is connected with a lever 41 fulcrumed at 42 upon a frame 43. It will be understood that by operating one of the levers 41, the corresponding gear 9 will be shifted endwise upon its shaft 7, and if we assume that the gears 9 and 10 are both disengaged from the drum gear 19, if the degree of movement of the gear 9 is sufficient, and in the proper direction, it will be made to engage the adjacent gear 19 of one of the drums while the opposite gear 10 will be thrown farther away from the drum. If, however, the gear 9 is in mesh with the gear 19 of the corresponding drum, the shifting of the gear 9 in the proper direction will disengage the gear 9 from the gear 19, and if the movement of the gear 9 be continued, the opposite gear 10 will be thrown into engagement with the same gear 19, for the purpose of reinforcing the movement of the drum.

The cable 18 which is passed around its drum, as heretofore explained, has one extremity connected with a plate 44 with which is connected a series of auxiliary cables 45 which pass over pulleys 46 mounted upon a stationary upper support 47. The pulleys 46 are located at a suitable height for the purpose of raising and lowering the pieces of scenery, one of which may be designated by the numeral 48 (see Fig. 1). It is assumed that the three auxiliary cables 45 will be used to shift a curtain or single piece of scenery 48, the three cables being connected with the curtain or other article to be shifted at suitable points, one of the said connections being indicated at 49 (see Fig. 1). The connection of the auxiliary cables with the piece of scenery is not illustrated for lack of room on the sheet. The one cable 45 which is connected with the piece of scenery, as shown at 48, passes over an additional pulley 50. It will be understood that any desired number of guide pulleys 50 may be employed in connection with the auxiliary cables 45. The other extremity of the cable 18 is also connected with the plate 44 and passes over a pulley 51 mounted upon a suitable support 52, whereby, as the auxiliary cables 45 move in opposite directions, the opposite extremities of the cable 18 move in harmony therewith. In order that the cable may be kept taut at all times, an additional cable designated 53 is connected with the cable 18, as shown at 54, and passes over a pulley 55, its opposite extremity being equipped with a counter-balance weight 56 of any desired size. This weight should be just sufficient to balance the curtain or piece of scenery with which the auxiliary cables 45 are connected.

The opposite portions of the cable 18 extending above the drum are equipped with enlargements or stops 57, each of which is arranged to operate a bell crank lever 58 fulcrumed, as shown at 59, upon a beam 60 of the main framework. The upper arm 61 of each of these levers is provided with an opening through which the cable passes. The stop 57, however, is too large to pass through this opening, and when the stop reaches the lever the latter is actuated to shift the gear 9 or 10 upon its shaft 7 or 8, as the case may be, depending upon the direction of travel of the drum, since the opposite arm designated 62 of each bell crank lever protrudes into the groove 14 and 15 of the gear 9 or 10, as the case may be, whereby the said gear is thrown out of mesh with the gear 19 of the corresponding drum, thus stopping the drum and also the travel of the cable. It will be understood that the stops 57 are so arranged upon the cable that when the curtain or piece of scenery is raised or lowered to the desired limit, its movement will be automatically stopped without the direct interposition of human agency. When, however, it is desired to set the drum in operation again, the person in charge operates a lever 41, whereby one of the gears is shifted into engagement with the gear 19 of the drum, causing the latter to operate in the desired direction.

From the foregoing description the use and operation of my improved mechanism will be readily understood. The shafts 7 and 8 are each equipped with fast and loose pulleys 63, which may be connected with a motor of any suitable character whereby the shafts are continuously operated in a direction to operate the drums in reverse directions, according as the gears upon the one or the other shaft are thrown into mesh with the gears of the drum. For instance, if a gear 9 upon the shaft 7 is thrown into engagement or mesh with the gear 19 of one of the drums, the latter will be rotated upon its shaft in a given direction; while if the gear 10 of the shaft 8 be thrown into mesh with the gear 19, of the same drum, the latter will be caused to rotate in the opposite direction. Now, if we assume that the cable 18 of any drum is connected through the agency of the auxiliary cables 45 with a curtain or piece of scenery 48, and if we also assume that the two gears 9 and 10 located adjacent this drum are both disengaged from the drum, the two gears will be shifted, through the means heretofore explained, to throw one of the gears into mesh with the gear of the drum if it is desired to raise the curtain or piece of scenery, while the other operating gear will be shifted into mesh with the gear of the drum if the curtain or piece of scenery is to be lowered. Again, if we assume that the curtain is rising, as soon as it has reached its upward limited movement, one of the stops 57 of the cable 18 will engage the arm 61 of one of the bell crank levers 58, and actuate the said lever sufficiently to shift the operating gear 9 or 10, as the case may be, upon its shafts sufficiently to disengage the said gear from the gear of the drum, whereby the latter ceases its motion and allows the curtain or piece of scenery to stop in the desired position of adjustment.

It will be understood that if the curtain or piece of scenery is being lowered, the other stop 57 of the cable 18, will perform the same function by coming in contact with the arm 61 of another bell crank lever, and shift the other gear when the curtain or piece of scenery has reached its proper downward limit of movement.

In explanation of the function of the brake band 21, it may be stated that when it is desired to change the hanging scenery, the cables 45 are disengaged at the points 49 and sandbags (not shown) are suspended from the ends of the cables 45, thus balancing the weight 56 and keeping the cable 18 in operative engagement with the drum 17. The sandbags (not shown) may then be raised and lowered in the same manner as the scenery just removed and as the different acts usually require scenery varying in weight as well as in required distance of travel, in the initial hanging, the weight 56 and the stop 57 must be adjusted with particular relation to the piece of scenery to be hung. In this operation, the band brake 21 is employed. The operator being stationed at the drum 17, places his foot on the rest 32, while his assistant removes the sandbags and secures the scenery to be hung to the ends of the cables 45. By releasing the brake 21, the scenery will be raised from the floor by the weight 56 and should the scenery continue to travel when entirely suspended, the brake 21 is again applied and a portion of the weight 56 removed until a counterbalance is obtained. If in the ordinary hanging the weight 56 is not sufficient to raise the scenery entirely from the floor, additional weights are added to counterbalance until the desired result is obtained. The stops 57 are then secured to the cable 18 in such a manner as to limit the travel of the scenery in each direction as heretofore explained.

In further explanation of my improved construction, attention is called to the fact that the members 17 heretofore termed drums, are simply operating wheels each having a narrow, grooved periphery of sufficient width to receive a single cable-convolution, merely to prevent the cable from slipping on its operating drum or wheel. This element 17 must therefore be distinguished from what is ordinarily termed a "winding-drum" upon which a rope or cable is wound, one extremity of the cable being attached to the drum, while the other extremity is connected with the member to be raised and lowered.

In my improved construction, the cable simply engages the drum or operating wheel 17 in operative relation intermediate the extremities of the cable, the two runs of the cable projecting beyond the operating drum, one run being connected through the auxiliary cables 45 and the connecting plate 44 with the scenic member to be operated, while the other run is connected with the first named run through the instrumentality of the said plate 44, thus virtually forming an endless loop which engages the pulley 51 above. The second run of the cable is also connected through the cable member 53 with the counterbalance weight 56, the said cable member passing over the pulley 55.

By virtue of my improved construction, I am able to greatly economize space since my drums or operating wheels are relatively narrow as distinguished from winding-drums or drums upon which the cable is wound or taken up as the scenic member is raised. In my improved construction the rotation of the drum simply actuates the cable by virtue of the frictional contact between the two elements, the portion of the cable which engages the drum being uniform at all times, but continually changing during the rotation of the drum.

While in the drawing each drum is shown to carry a complete cable convolution, this is not indispensable since the cable may simply engage the drum as a pulley engages a belt. However, to avoid possible slipping of the cable upon the drum, it is preferred to employ the single convolution arrangement. Hence, when the term "drum" is used in the specification and claims, it must be understood to mean an operating wheel of the character just explained only, and not a "winding-drum" since the function of the latter is absent in the use of my improved construction.

Having thus described my invention, what I claim is:

1. An apparatus of the class described, the combination with an article to be handled, of an operating drum provided with a gear, operating shafts mounted on opposite sides of the drum, a gear mounted upon each shaft and adjustable thereon to engage the gear of the drum, a suitable connection between the two gears whereby they may be simultaneously shifted on their respective shafts in opposite directions, the two shafts being so rotated that their gears will cause the drum to move in opposite directions, a main cable mounted on the drum, a number of auxiliary cables, a suitable connection between one extremity of the main cable and the auxiliary cables at one end, the other end of the latter leading to the article to be operated, and a counterbalance weight connected with the main cable, substantially as described.

2. In apparatus of the class described, the combination with the article to be handled, of an operating drum provided with a gear, shafts mounted upon opposite sides of the drum, gears splined upon the shafts and adapted to mesh with the drum gear, a lever fulcrumed intermediate the two shafts and having its extremities connected with the gears upon the said shafts, means for operating the lever to shift said gears in opposite directions whereby the one or the other may be made to mesh with the gear of the drum, and a cable mounted on the drum and connected with the article to be handled, substantially as described.

3. The combination with a load to be manipulated, of a drum mounted to rotate and provided with a gear, operating shafts mounted on opposite sides of the drum and turning in opposite directions, gears splined upon the respective shafts and adapted to mesh with the gear of the drum, a cable mounted on the drum, means for connecting one extremity of the cable with the load to be manipulated, a counterbalance weight, means for connecting the cable with the said weight, and suitable means connected to be automatically operated by the cable for shifting the gears upon the operating shafts, whereby the meshing gear is disengaged from the gear of the drum, and a suitable connection between the two gears whereby when one is moved in one direction upon its shaft the other is moved in the opposite direction, substantially as described.

4. In an apparatus of the class described, the combination with the article to be shifted, of a drum mounted to rotate and provided with a gear, operating shafts mounted on opposite sides of the drum and rotating in opposite directions, gears mounted upon the respective shafts and connected to be simultaneously shifted on the respective shafts in opposite directions, the said gears of the operating shafts being both mounted to mesh with the gear of the drum when properly adjusted, bell crank levers suitably mounted and connected with the respective gears of the operating shafts, to shift the said gears upon the shafts when the levers are operated, a cable mounted upon the drum, means for connecting one extremity of the cable with the article to be manipulated, a counterbalance weight, means for connecting the weight with the cable, stops mounted upon both runs of the cable above the drum and arranged to act upon the said bell crank levers to operate the latter to shift the gears upon the operating shafts, substantially as described.

5. The combination with a frame, and an article to be manipulated, of a shaft, a drum mounted to rotate on the shaft and provided with a gear, operating shafts mounted on opposite sides of the drum and rotating in opposite directions, gears splined upon the respective shafts and adapted to be adjusted to engage the drum gear, the gears of the operating shafts being both mounted to mesh with the drum gear when properly adjusted, a connection between the two gears of the operating shafts whereby when one gear is moved in one direction the other gear is simultaneously shifted in the opposite direction, a cable mounted upon the drum, means for connecting one extremity of the cable with the article to be handled, counterbalance means, a connection between said means and the cable, and means mounted upon the frame and automatically actuated by the cable for shifting the meshing gear upon either operating shaft out of engagement with the drum gear when the cable has reached its proper limit of movement in either direction, substantially as described.

6. In an apparatus of the class described, the combination of a number of drums mounted to rotate independently of each other, operating shafts mounted on opposite sides of the drums, each drum being provided with a gear, gears splined upon each of the operating shafts and adapted when properly adjusted to mesh with the gears of their corresponding drums, a connection between the individual gears of each two gears oppositely located on the operating shafts whereby, as one gear is shifted in one direction, the other gear is shifted in the opposite direction, one of the said gears of each pair when sufficiently actuated being brought into mesh with the gear of its corresponding drum, means for manually actuating one of the gears upon one of the actuating shafts for the aforesaid purpose, a cable mounted upon the drum, and a suitable connection between each of the gears upon each of the actuating shafts of the cable, whereby the last named connection is automatically actuated to shift the gear with which it is connected, for the purpose set forth.

7. In an apparatus of the class described, the combination with a drum mounted to rotate, the said drum being provided with a gear and a friction zone, a brake applied to the friction zone, a cable mounted upon the drum, operating shafts mounted on opposite sides of the drum, a gear splined upon each shaft, a connection between the two gears whereby when one is shifted in one direction the other is shifted in the opposite direction, means for manually shifting one of the gears, and means actuated by the cable for automatically shifting the gear upon either operating shaft in one direction whereby the other gear is shifted in the opposite direction, substantially as described.

8. In an apparatus of the class described, the combination of a drum mounted to rotate, an operating shaft mounted upon each side of the drum, the drum being provided with a gear, the operating shafts rotating in opposite directions, a gear splined upon each operating shaft, a connection between the two gears whereby when one is shifted in one direction the other is shifted in the opposite direction, and suitable means acting directly upon one of the gears for shifting the latter upon its shaft, for the purpose set forth.

9. In an apparatus of the class described, the combination of a drum mounted to rotate, a cable mounted on the drum, an operating shaft mounted upon each side of the drum, the drum having a gear, the operating shafts rotating in reverse directions, a gear splined upon each operating shaft and arranged when properly adjusted to mesh with the drum gear, and means for automatically shifting either gear upon its shaft, substantially as described.

10. The combination of a drum mounted to rotate, a cable mounted upon the drum, the latter being provided with a gear, operating gears adjustably mounted on opposite sides of the drum, means for rotating the last named gears in opposite directions, the operating gears being capable of adjustment to mesh with the drum gear, a connection between the operating gears whereby when one is shifted in one direction the other is shifted in the opposite direction, means for manually shifting either gear, and means automatically actuated by the cable for shifting either gear, substantially as described.

11. The combination with a movable load, of a drum mounted to rotate and provided with a gear, operating shafts mounted on the opposite sides of the drum and rotating in opposite directions, gears splined upon the opposite shafts and adapted to be adjusted to engage the drum gear, the gears of the operating shafts being both mounted to mesh with the drum gear when properly adjusted, a connection between the two gears of the operating shafts, whereby when one gear is moved in one direction, the other gear is simultaneously shifted in the opposite direction, a cable connected in operative relation with the drum, means for connecting one extremity of the cable with the said load to be elevated, a counterbalance weight, and a connection between the said weight and the cable.

12. The combination with a movable load, of an operating drum, a cable having a portion intermediate its extremities, engaging the drum in operative relation, whereby as the drum is rotated, the cable is actuated, the cable having two runs extending beyond the drum, a connection between one run of the cable and the load, means for connecting the two runs of the cable beyond the drum to form an endless loop, a guide forming a support for the loop, a counterbalance weight, a connection between the said weight and the run of the cable on the side of the guide opposite the run connected with the load, and means for rotating the drum in reverse directions, whereby the scenic member may be raised and lowered.

13. The combination with a movable load, of an operating drum, a cable having a portion intermediate its extremities engaging the drum in operative relation, the cable having two runs extending beyond the drum, a connection between one run of the cable and the load, means for connecting the two runs of the cable with each other to form an endless loop, a guide for supporting said loop, a counterbalance weight, a connection between the counterbalance weight and one run of the cable on the side of the guide opposite the run connected with the load, shafts mounted on opposite sides of the drum and rotating in reverse directions, and means for connecting the drum in operative relation with the said shafts.

In testimony whereof I affix my signature in presence of two witnesses.

SETH G. BAILEY.

Witnesses:
A. J. O'BRIEN,
A. EBERT O'BRIEN.